United States Patent [19]

Ueki et al.

[11] Patent Number: 5,223,465
[45] Date of Patent: Jun. 29, 1993

[54] OLEFIN POLYMERIZATION CATALYST

[75] Inventors: Satoshi Ueki; Hiroyuki Furuhashi; Masahide Murata; Shigeyuki Toki, all of Iruma, Japan

[73] Assignee: Tonen Corporation, Tokyo, Japan

[21] Appl. No.: 776,350

[22] PCT Filed: Mar. 13, 1991

[86] PCT No.: PCT/JP91/00345
§ 371 Date: Nov. 18, 1991
§ 102(e) Date: Nov. 18, 1991

[87] PCT Pub. No.: WO91/13917
PCT Pub. Date: Sep. 19, 1991

[30] Foreign Application Priority Data

Mar. 16, 1990 [JP] Japan .................. 2-64398
Mar. 16, 1990 [JP] Japan .................. 2-64399

[51] Int. Cl.⁵ .............................. C08F 4/64
[52] U.S. Cl. ........................ 502/117; 502/103; 502/112; 526/160; 526/165
[58] Field of Search ............ 502/103, 117, 112

[56] References Cited

U.S. PATENT DOCUMENTS 3,634,340 1/1972 Gunther et al. ............. 502/117 X
3,670,043 6/1972 Kubicek et al. ............. 502/103 X
4,978,730 12/1990 Maezawa et al. ............ 502/103 X Primary Examiner—Patrick P. Garvin
Attorney, Agent, or Firm—Wenderoth, Lind & Ponack

[57] ABSTRACT

The present invention aims at providing an olefin polymerization catalyst comprising, as a component, a transition metal compound having two ligands such as β-diketone, etc. coordinated, and having excellent properties as a polymerization catalyst in the polymerization of olefins including styrene compounds. This olefin polymerization catalyst comprises:

(a) a transition metal compound represented by the general formula,

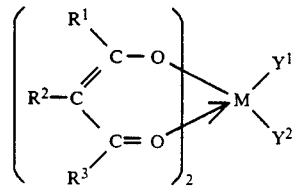

wherein M represents titanium, zirconium, hafnium or vanadium, $Y^1$ and $Y^2$ each represent, same or different, halogen atoms or alkyl groups containing 1 to 10 carbon atoms and $R^1$, $R^2$ and $R^3$ each represent hydrogen atoms or hydrocarbon groups containing 1 to 10 carbon atoms, at least one of which is a hydrogen atom but all of which must not be hydrogen atoms, and (b) an organoaluminum compound, in particular, aluminoxane.

1 Claim, No Drawings

OLEFIN POLYMERIZATION CATALYST

TECHNICAL FIELD

This invention relates to an olefin polymerization catalyst.

TECHNICAL BACKGROUND

An olefin polymerization catalyst consisting of a vanadium compound having three ligands such as $\beta$-diketone, etc. coordinated and an organoaluminum compound, in combination, is well known.

On the other hand, a titanium compound or zirconium compound each having two lignads coordinated is known, but it has not been reported that such a compound has a polymerization capacity of olefins.

The principal object of the present invention is to provide an olefin polymerization catalyst comprising, as a component, a transition metal compound having two ligands such as $\beta$-diketone, etc. coordinated.

The inventors have made various studies and consequently, have found that the object of the present invention can be attained by combination of the transition metal compound with an organoaluminum compound, in particular, aluminoxane. The present invention is based on this finding. Disclosure of the Invention Accordingly, the gist of the present invention consists in an olefin polymerization catalyst comprising:

(a) a transition metal compound represented by the general formula,

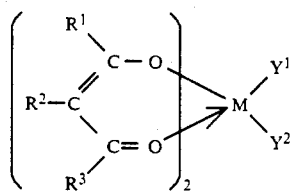

wherein M represents titanium, zirconium, hafnium or vandium, $Y^1$ and $Y^2$ each represent, same or different, halogen atoms or alkyl groups containing 1 to 10 carbon atoms and $R^1$, $R^2$ and $R^3$ each represent hydrogen atoms or hydrocarbon groups containing 1 to 10 carbon atoms, at least one of which is a hydrogen atom but all of which must not be hydrogen atoms, and (b) an organoaluminum compound. Best Embodiment for practicing the Invention

Catalyst

The catalyst of the present invention consists of the above described transition metal compound (a) and the organoaluminum compound (b).

(a) Transition Metal Compound

The transition metal compound (a) (which will hereinafter be referred to as Compound (a)) is represented by the foregoing general formula.

In the general formula, M, $Y^1$, $Y^2$, $R^1$, $R^2$ and $R^3$ have the same meanings as described above and M is preferably titanium or zirconium.

When $Y^1$ and $Y^2$ represent halogen atoms, examples of the halogen atom are chlorine, bromine, iodine and fluorine, and chlorine is particularly preferable. In the case of alkyl groups, examples of the alkyl group are methyl, ethyl, propyl, isopropyl, butyl, isobutyl, sec-butyl, pentyl, hexyl,- 2-ethylhexyl, octyl groups and the like. It is particularly preferable that $Y^1$ and $Y^2$ are both halogen atoms.

When $R^1$, $R^2$ and $R^3$ are hydrocarbon groups, examples of the hydrocarbon groups are alkyl groups, cycloaklyl groups, aryl groups and aralkyl groups and the alkyl groups are preferable. The alkyl groups are selected from those exemplified as $Y^1$ and $Y^2$. Examples of the cycloaklyl groups are cyclopentyl, cyclohexyl, methylcyclohexyl groups and the like. Examples of the aryl group are phenyl, tolyl, xylyl, naphthyl groups and the like. Examples of the aralkyl groups are benzyl, phenethyl, 3-phenylpropyl groups and the like.

Examples of Compound (a) represented by the foregoing general formula will not be illustrated:

(i) Case wherein $Y^1$ and $Y^2$ are halogen atoms, $R^2$ is a hydrogen atom and $R^1$ and $R^3$ are hydrocarbon groups. $R^1/R^3$: $CH_3/cH_3$, $CH_3/C_2H_5$, $C_2$ $CH_3/C_6H_5CH_2$, $C_6H_5CH_2/C_6H_5CH_2$, $C_2H_5/C_6H_5CH$ 2, $C_6H_5/$ $C_6H_5CH_2$ (ii) Case wherein $Y^1$ and $Y^2$ are halogen atoms, $R^2$ is a hydrocarbon group and one of $R^1$ and $R^3$ is a hydrogen atom and the other is a hydrocarbon group. $R^2/R^1$ or $R^3$:$CH_3/CH_3$, $C_2H_5/CH_3$, $CH_3/C_2H_5$, $C_6H_5/CH$ 3, $CH_3/C_6H_5$, $C_6H_5/C_2H_5$. $C_2H_5/$ $C_6H_5CH_2/CH_3$, $C_3/C_6H_5CH_2$, $C_6H_{5c}$ (iii) Case wherein $Y^1$ and $Y^2$ are halogen atoms, $R^2$ is a hydrogen atom and one of $R^1$ and $R^3$ is a hydrogen atom and the other is a hydrocarbon group. $R^1$ or $R^3$: $CH_3$, $C_2H_5$k $C_6H_5$ Above all, the following compounds are preferable.

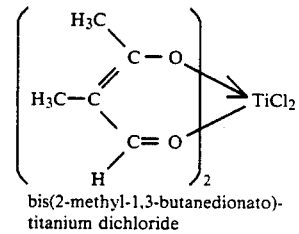

bis(2-methyl-1,3-butanedionato)-titanium dichloride

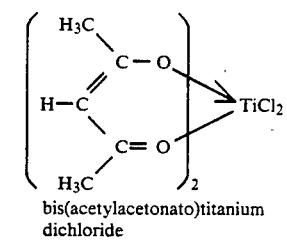

bis(acetylacetonato)titanium dichloride

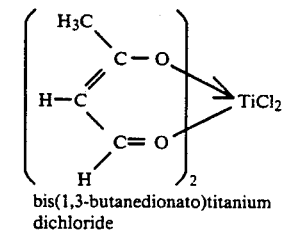

bis(1,3-butanedionato)titanium dichloride bis(2-methyl-1,3-butanedionato)zirconium cidhloride, bis(acetylacetonato)zirconium dichlrodie, bis(1,3-butanedionato)zirconium dichlrode and bis(acetylacetonato) hafnium dichlrode.

Compound (a0 can if necessary be contacted with metal oxides. The metal oxides used herein are oxides of elements selected from the group consisting of Group II to IV elements of Periodic Table, illustrative of which are $B_2O_3$, $MgO$, $Al_2O_3$, $SiO_2Cao$, $TiO_2ZnO$, $ZrO_2$, $SnO_2$, $BaO$, $ThO_2$, etc. Above all, $B_2O_3$, $MgO$, $Al_2O_3$, $SiO_2TiO_2$ and $ZrO_2$ are preferable and $Al_2O_3$ and $SiO_2$ are more preferable. Composite oxides containing these metal oxides can also be used such as $SiO_2$-$MgO$, $SiO_2$-$Al_2O_3$, $SiO_2$-$tiO_2$, $SiO_2$-$V_2O_5$, $SiO_2$-$V_2O_5$, $SiO_2$-$Cr_2O_3$ $SiO_2$-$TiO_2$-$MgO$ and the like.

Preferably, the above described metal oxides nd composite oxides are present in the form of anhydrides, but contamination thereof with such a small amount of hydroxides as being ordinarily coexistent can be permitted.

The metal oxides should preferably be handled for the purpose of removing poisonous substances before use in such a manner that they are calcined at a high temperature as far as possible and are not brought into direct contact with the air.

The contact of Compound (a) with the metal oxide is generally carried out in the presence of inert hydrocarbon such as hexane, heptane, cyclohexane, benzene, toluene, xylene or the like at a temperature of from room temperature to the boiling point of the hydrocarbon for 0.5 to 20 hours. The metal oxide is used in a proportion of 1 to 500 parts by weight to 1 part by weight of Compound (a).

Compound (a) can be prepared by any of known methods, for example, disclosed in Japanese Patent Publication No. 21010/1971.

(b) Organoaluminum Compound

As the organoluminum compound (b) (which will hereinafter be referred to as Compound (b)), there can be used alminoxanes and organoaluminum compounds represented by the general formula $R^4nAlX_{3-n}$. the aluminoxanes are preferable. For the polymerization os styrene compounds, in particular, the aluminoxanes are preferably used.

The aluminoxanes are represented by the general formula

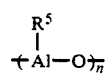

wherein $R^5$ is a hydrocarbon group of $C_1$ to $C_5$, which can ordinarily be prepared by reacting an organoaluminum compound represented by the general formula $AlR^5_3$ with water or a compound having two or more hydroxyl groups.

Examples of this roganolauminum compound are tirmethylauminm, triethyl-aluminum, triisobutylaluminum, trihexyaluminum, trictyaluminum, triphelyaluminojm and the like. Above, all trimethylaluminum is preferable.

As the water to be reacted with the organoaluminum compound, there is used not only ordinary water but also water of crystallization, such as that of iron sulfate, copper sulfate and the like. As the compound having two or more hydroxyl groups to be reacted with the organolalum compound, there are used diol compounds of $C_2$ to $C_{16}$, monosaccharides and the like.

As the diol compound, there are used ethyleen glycol, propylene glycol, pinacol, 1,2-cyclohexane diol, 1,4-cyclohexane diol, catechol, resorcin, hydroquinone and the like and as themonosaccharide, there are used sorbitol, glucose, erythritol and the like.

In the general formula $R^4nAlX_{3-n}$ of the organoaluminum compound used as Compound (b), $R^4$ is analkyl group or aryl group containing 1 to 18 carbon atoms, X is a halogen atom or hydrogen atom and n is in the range of $1 \leq n < 3$. Examples of the organoaluminum compound are dialkylaluminum monohalides such as dimethylaliminum chloride, diethalumin chorkdie, deithelum bormie, diethaluminum iodeke, diisobutyalm chloride, etc., monoalkyalm dihaldies such a methalum dichloride, ethalm dichloride, methyl-aluminum dibormide, ethalumin dibromide, ethalumn diidide, isobutyl-aluminum dichloride, etc, and alkyalumn sesquihaldies such as ethyalm sesquichlirde, etc.

Compound (a) and Compound (b) are used in a proportion of 1 to $10^6$ gram atoms, preferably 10 to $10^5$ gram atoms of Compound (b), as aluminum metal, to 1 mole of Compound (a).

Polymerization of Olefins

The catalyst of the present invention can be applied to homopolymerization of olefins such as not only ehtylene but also a-olefins, e.g. propylene, 1-butene, 1-hexene, 4-methyl-1-pentene, 1-octene, etc. or copolymerization thereof with other olefins. In this specification, the term of olefins is used to include styrene compounds.

For example, the styrene compounds to be polymerized by the catalyst of the present invention include styrene, α-methylstyrene, 0-methylstryene, m-methylstryen, p-methylstryene, o, m-dimethysltre, o-ehtylstrene, m-ethylstryem, p-ethylstrene, o-chlorostrnem and the like.

The polymerization reaction can be carried out either in gaseous phase or in liquid phase. When the polymerization is carried out in liquid phase, inert hydrocarbons such as n-butane, i-butane, n-penatne, i-pentane, hexane, heptaine, octaine, cyclohexane, benzene, toluene, xylene, etc. or liquid monomers can be used. As the inert hydrocarbon, in particular, benezene, toluene and xylene can preferably used. The polymerization temperature is ordinarily in the range of $-80°$ to $+150°$ C., preferably $40°$ to $120°$ C. and the polymerization pressure is, for example, 1 to 60 atom. Control of the molecular weight of the resulting polymer is carried out in the presence of a known molecular weight controlling agent such as hydrogen. In the copolymerization, the amount of other olefins to be copolymerized with the olefin is ordinarily up to 30% by weight, in particular, 0.3 to 15% by weight of the olefin. The polymerization of the styrene compound includes not only homopolymerization but also copolymerization (random polymerization or block polymerization) with other olefins. The polymerization reaction using the catalyst system of the present invention can be carried out continuously or batchwise under ordinary conditions and in one stage or two or more stages.

EXAMPLES

The present invention will be illustrated by the following examples without limiting the same.

EXAMPLE 1

300 ml of dried toluene was charged in a glass autoclave of 1000 ml replaced adequately with nitrogen gas and heated to 50° C., to which $2.5 \times 10^5$ moled of bis-(acetylacetonato)zirconium dichloride and 25 milligram atoms (as aluminum metal) of methylaluminoxane were then added.

To the system was fed ethylene gas to maintain the inner pressure at 1 atom and the ethylene was polymerized with agitation for 1 hour. The polymerization activity of the catalyst (CE) was 1510 g/g/·Zr·atm·hour. The number average molecular weight of the resulting polymer was $1.54 \times 10^4$. The ratio of the weight average molecular weight and number average molecular weight was 14.6.

EXAMPLE 2

Example 1 was repeated except using bis(acetylacetonato)titanium dichloride instead of the bis(acetylacetonato)zirconium dichloride to effect the polymerization of ethylene. CE was 380 g/g·Ti·atm·hour. The resulting polymer had a viscosity average molecular weight of $2.4 \times 10^6$.

EXAMPLE 3

Example 2 was repeated except using 5 milligram atoms (as aluminum metal) of methylaluminoxane to effect the polymerization of ethylene. CE was 590 g/g/Ti·atm·hour.

EXAMPLE 4

Example 3 was repeated except using bis(2-methyl-1,3-btanedionato)titanium dichloride instead of the bis(acetylacetonato)titanium dichloride to effect the polymerization of ethylene. CE was 1170 g/g·Ti·atm·hour.

EXAMPLE 5

A solution of 0.2 g of bis(acetylacetonaot(zirconium dichloride in tiluene was added to a slurry of 3.0 g of alumina calcined at 500° C. for 6 hours in toluene and stirred at 70° C. for 2 hours. The solid was separated, adequately washed with toluene and n-hexane and further dried to obtain a zirconium content of 9.1 mg in 1 g of the solid.

Polymerization of ethylene was carried out in an analogous manner to Example 3 except using the solid obtained as above instead of the bis(acetylacetonato) titanium dichloride. CE was 2600 g/g ·Zr·atm·hour.

REFERENCE EXAMPLE 1

Polymerization of ethylene was carried out in an analoguos manner to Example 1 except using tetra(acetylacetonato)zirconium instead of the bis(acetylacetonato) zirconium dichloride, but no ethylene was polymerized.

EXAMPLE 6

0.2 millimole of bis(acetylacetonato)titanium dichloride, 10 milligram atoms (as aluminum metal) of methylaluminoxane and 250 ml of toluene were charged in a glass autoclave of 1000 ml replaced sufficiently by nitrogen gas, to which 100 g of p-methylstyrene was then added, and the p-methylstyrene was polymerized at 50° C. for 2 hours with agitation. CE was760 g/g·Ti·atm·hour.

EXAMPLE 7

0.2 millimole of bis(2-methyl-1,3-butanedionaot)titanium dichlrode, 10 milligram atoms (as aluminum methal) of methylalunooxane and 250 ml of toluene were charged in a glass autoclave of 1000 ml replaced sufficiently by nitrogen gas, to which 50 g of styrene was then added, and the styrene was polymerized at 50° C. for 2 hours with agitation. CE was 518 g/g·Ti·atm·hour.

EXAMPLE 8

0.1 millimole of bis(acetylacetonato)zirconium dichloride and 10 milligram atoms (as aluminum metal) of methylaluminoxane were charged in a flask of 500 ml replaced sufficiently by nitrogen gas, to which 200 g of p-methylstyrene was then added, and the p-methylstrene was polymerized at 50° C. for 2 hours with agitation. CE was 854 g/g·Zr·atm·hour.

REFERENCE EXAMPLE 2

Polymerization of p-methylstyrene was carried out in an analoguous manner to Example 3 except using tetra(acetylacetonato)zirconium instead of the bis(acetylacetonato) zirconium dichloride, but no p-methylstyrene was polymerized. Utility and Possibility on Commercial Scale The catalyst of the present invention has excellent properties as a polymerization catalyst in the polymerization of olefins, in particular, ethylene and styrene compounds.

We claim:

1. An olefin polymerization catalyst comprising:
  (a) a transition metal compound represented by the general formula,

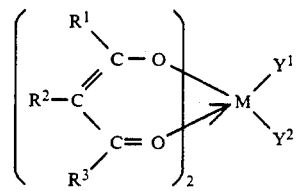

wherein M is zirconium, $Y^1$ and $Y^2$ each represent, same or different, halogen atoms or alkyl groups containing 1 to 10 carbon atoms and $R^1$, $R^2$ and $R^3$ each represent hydrogen atoms or hydrocarbon groups containing 1 to 10 carbon atoms, at least one of which is a hydrogen atom but all of which must not be hydrogen atoms, and
  (b) an aluminoxane compound.

* * * * *